US006152333A

United States Patent [19]

Binder

[11] Patent Number: 6,152,333

[45] Date of Patent: Nov. 28, 2000

[54] APPARATUS FOR EXTRUSION AND METERED DELIVERY OF FREE-FLOWING SUBSTANCES

[75] Inventor: Alfred Binder, Bisingen, Germany

[73] Assignee: Kress-Elektrik GmbH & Co., Elektromotorenfabrik, Bisingen, Germany

[21] Appl. No.: 09/330,719

[22] Filed: Jun. 11, 1999

[30] Foreign Application Priority Data

| | | | |
|---|---|---|---|
| Nov. 4, 1998 | [DE] | Germany | 298 19 715 U |
| Mar. 5, 1999 | [DE] | Germany | 99104459 |

[51] Int. Cl.$^{7}$ .................... G01F 11/42

[52] U.S. Cl. .................... 222/333; 222/389

[58] Field of Search .................... 222/333, 325, 222/326, 399, 389, 66, 262; D8/14.1

[56] References Cited

U.S. PATENT DOCUMENTS

| | | | |
|---|---|---|---|
| 1,972,181 | 9/1934 | Chambers | 222/262 |
| 3,813,012 | 5/1974 | Laird | 222/326 |
| 3,921,858 | 11/1975 | Bemm | 222/389 X |
| 4,273,270 | 6/1981 | Kray | 222/389 X |
| 4,826,050 | 5/1989 | Murphy et al. | 222/334 X |
| 5,353,971 | 10/1994 | Vaziri | 222/326 |
| 5,909,830 | 6/1999 | Bates et al. | 222/333 X |

FOREIGN PATENT DOCUMENTS

| | | |
|---|---|---|
| 92 14 96601 | 3/1993 | Germany . |
| 41 34 141 A1 | 4/1993 | Germany . |
| 298 04 402 U1 | 6/1998 | Germany . |

*Primary Examiner*—Kevin Shaver
*Assistant Examiner*—Thach H. Bui
*Attorney, Agent, or Firm*—Darby & Darby

[57] ABSTRACT

An apparatus for extrusion and metered delivery of free-flowing substances, having a housing (11); having a receiving space (12), openable at least on one side, for a disposable material package; having an expulsion nozzle (13); having a compressed-air connection; and having, on the side opposite the expulsion nozzle (13), a piston that is displaceable in the direction of the expulsion nozzle (13) in the receiving space (12) or in the disposable material package, and pushes the substance ahead of it and thereby ejects it from the expulsion nozzle (13), compressed air being fed from the compressed-air connection to the side of the piston facing away from the expulsion nozzle (13), is characterized in that a compressor (30) driven by an electric motor (20) is arranged in/on the housing (11) in order to generate the compressed air.

5 Claims, 3 Drawing Sheets

APPARATUS FOR EXTRUSION AND METERED DELIVERY OF FREE-FLOWING SUBSTANCES

The present invention relates to an apparatus for extrusion and metered delivery of free-flowing substances, as defined in the preamble of claim 1.

Apparatuses for extrusion and metered delivery of free-flowing substances are known. Free-flowing substances in this context are, for example, sealing compounds such as those used in motor vehicle repair and in construction trades, for example silicone sealing compounds or the like. Sealing compounds of this kind are available in disposable packages, for example cartridges or plastic-film tubular bags, which are inserted into the receiving space of compressed air-driven apparatuses for the expulsion and metered delivery of free-flowing substances, and are emptied through an expulsion nozzle by being acted upon by compressed air.

The sealing compounds are ejected using a piston which is arranged either in the receiving space when plastic-film tubular bags are used, or in the cartridge itself when cartridges are used.

Manually actuated cartridge evacuation devices for applying pasty free-flowing substances have been known for some time.

DE 298 04 402 U1 discloses a gun-shaped cartridge evacuation device which is mechanically driven by an electric motor. By way of a pinion, the electric motor moves a pusher rod, configured as a toothed rod, in the axial direction.

DE 41 34 141 A1 discloses a compressed-air gun which can be connected via pressure lines to a compressor separate from the compressed-air gun. Since the use of such compressed-air guns always requires also bringing along a separate compressor, remote from the compressed-air gun, which in turn must be driven by, for example, an electric motor or internal combustion engine, and since pressure lines from the compressor to the compressed-air gun are necessary, the handling of a compressed-air gun of this kind is cumbersome and laborious, especially at inaccessible locations on building sites. For a compressor driven by an electric motor, an electrical outlet and/or provision of a long electrical cord is additionally necessary.

It is the object of the invention to develop an apparatus for extrusion and metered delivery of free-flowing substances of the generic type in such a way that it can, in the simplest possible way, be handled even in poorly accessible locations and, in particular, independently of external pressure lines.

This object is achieved according to the present invention, in an apparatus for extrusion and metered delivery of free-flowing substances of the kind described initially, by the features of claim 1, and has the advantage that pressure generation is accomplished with an extremely compact configuration independently of external pressure lines. The apparatus for extrusion and metered delivery of free-flowing substances is thus easy to handle and can readily be used even in poorly accessible locations.

Preferably, provision is made for there to be provided, on a housing of the apparatus, a switching device with which the electric motor can be activated and deactivated and simultaneously therewith the compressed-air connection can be pressurized and vented. This makes possible one-handed operation of the apparatus, and precise delivery of the free-flowing substance under the control of the switching device.

In particular for adaptation to different pasty materials and in order to establish a uniform material flow through the expulsion nozzle, it is advantageous to provide a pressure regulator with which the pressure acting on the piston can be adjusted.

The apparatus can be powered both by a battery and by line power. Operation of the electric motor with a battery has the great advantage that no electrical connecting lines are necessary. The apparatus then has neither external compressed-air lines nor external electrical connecting lines.

A particularly advantageous embodiment provides for the receiving space for the disposable material packages to be replaceable, and releasably attachable to the housing by way of a quick-release fastener. It is thereby possible for receiving spaces adapted to different material packages, e.g. cartridges or plastic-film pouches, to be mounted easily on the housing. This makes the apparatus usable in versatile fashion.

Further advantages and features are the subject of the description below and of the representation of an exemplifying embodiment of the invention in the drawings, in which:

FIG. 1 schematically shows an exploded representation of an apparatus for extrusion and metered delivery of free-flowing substances which makes use of the invention;

The apparatus shown in FIGS. 1, 2, and 3 for extrusion and metered delivery of free-flowing substances, for example silicone sealing compounds or the like, can in purely theoretical terms be operated not only with air but also with a different pressure medium, so that the functionality described below in connection with compressed-air operation of the apparatus for extrusion and metered delivery of free-flowing substances is not limited to compressed air as the pressure medium.

Apparatus 10 has a housing 11 that is joined to a cylindrical receiving tube 12, openable at least on one side, into which a disposable material package, for example a tubular bag package or a cartridge, can be inserted.

Figure 3:
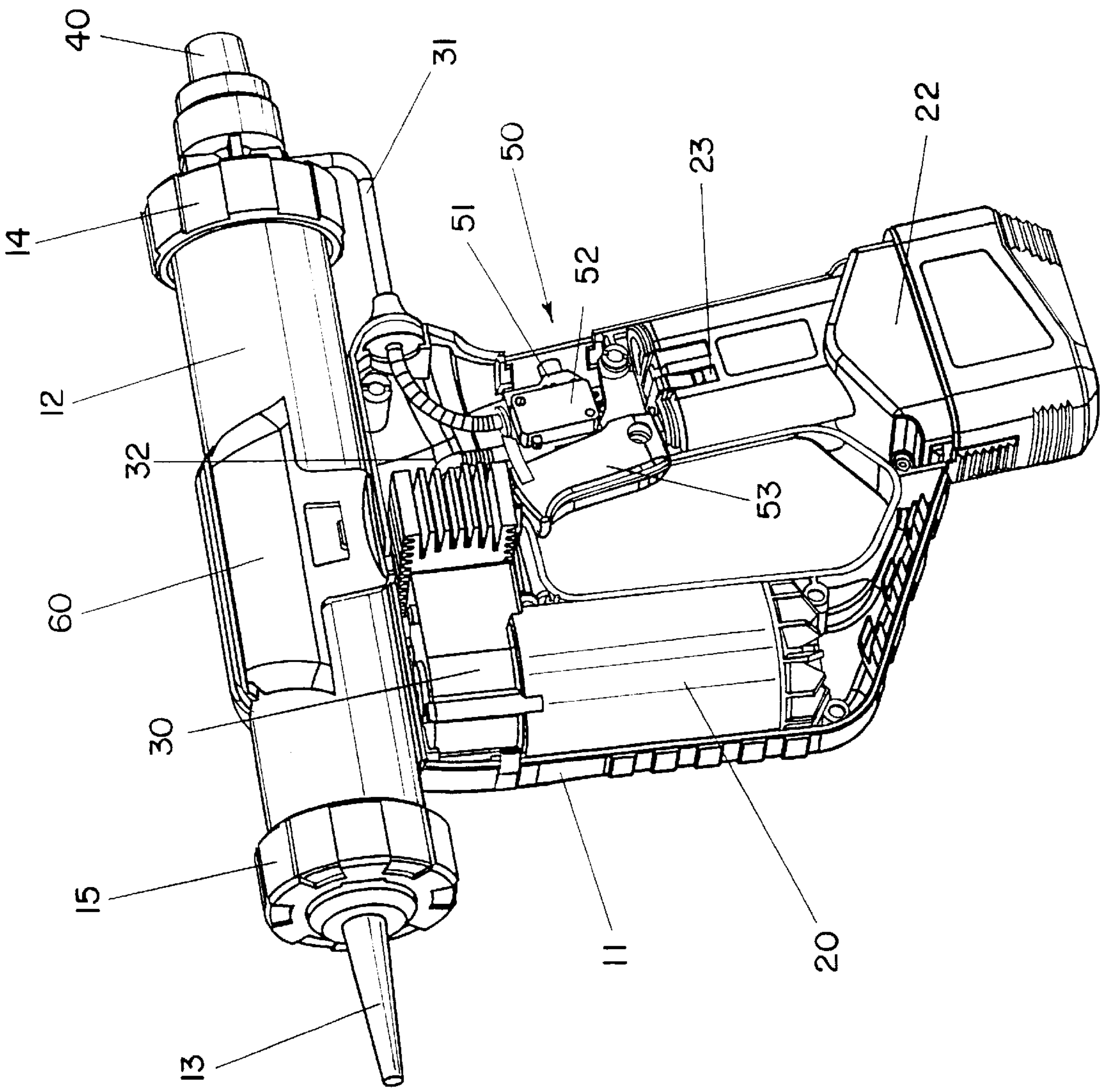
FIG. 3 shows, in partly cutaway view, a different exemplifying embodiment of an apparatus making use of the invention.

Receiving tube 12 is preferably attachable releasably to housing 11 by means of a quick-release fastener 60 (shown in FIG. 3). It is thereby possible, very quickly and easily, to replace, for example, receiving tubes 12 adapted for tubular bag packages with receiving tubes adapted for cartridges. The apparatus is thus not defined for the use of one type of material package, for example tubular bag packages, but rather is adaptable to different material packages.

At one of its ends, receiving tube 12 has a removable cover element 15 equipped with an expulsion nozzle 13; at its other end it is closed off by a cover element 14 attached to receiving tube 12.

An electric motor 20, powered by a battery 22 and driving a compressor 30, is arranged in housing 11. It is understood that electric motor 20 can also be line-powered. In this case all that is needed is an electrical power cord, which can be omitted for battery-powered operation.

Compressor 30 is connected via a pressure line 31 to a compressed-air connection of receiving tube 12. What is provided when plastic-film tubular bags are used as the disposable material packages is a receiving tube 12 in which is arranged a piston (not shown), known per se, which when acted upon by compressed air exerts, on its side facing away from expulsion nozzle 13, a pressure such that the pasty substance present in the disposable material package is extruded through expulsion nozzle 13. When cartridges are used, the piston is part of the cartridge. In this case the cartridge is mounted in sealed fashion in a receiving tube 12 adapted to it, and the piston of the cartridge is acted upon by compressed air on its side facing away from expulsion nozzle 13.

In order to establish a uniform material flow, there is provided on cover element 14 a pressure regulator 40, known per se, with which the pressure in the pressure space, facing away from expulsion nozzle 13, of tube 12 can be adjusted. It is understood that the pressure regulator can also be arranged at a different point; for example, it can be arranged in housing 11 adjacent to a switching device 50 to be described below.

A switching device 50, which is connected via a pressure input line 32 to compressor 30, is provided between compressor 30 and the pressure connection arranged on tube 12. Switching device 50 comprises a pressure switch 51 as well as an electrical switch 52, both of which can be actuated simultaneously by way of a trigger-like actuation element 53. This switching device 50 makes possible simultaneously application of pressure to the piston located in tube 12, and activation of electric motor 20 via switch 52. Actuation element 53 is preloaded, for example, by way of a spring (not shown), so that after an actuation it automatically returns to its starting position in which the electric motor is deactivated and at the same time the pressure space in tube 12 is vented. This ensures, to make possible precise material delivery, that squeezing of the disposable material package stops immediately upon release of movement element 53.

Figure 1:
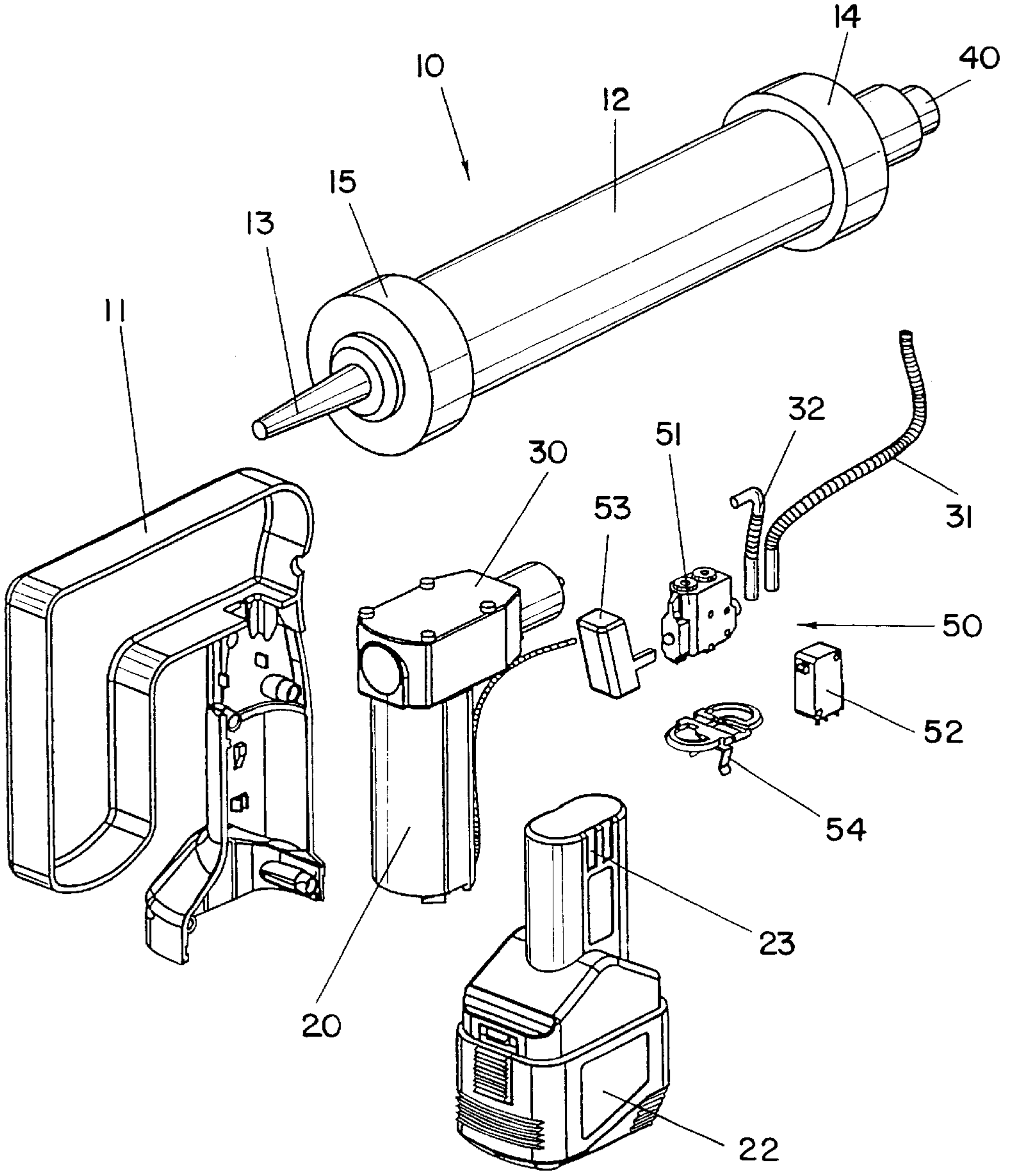
Figure 2:
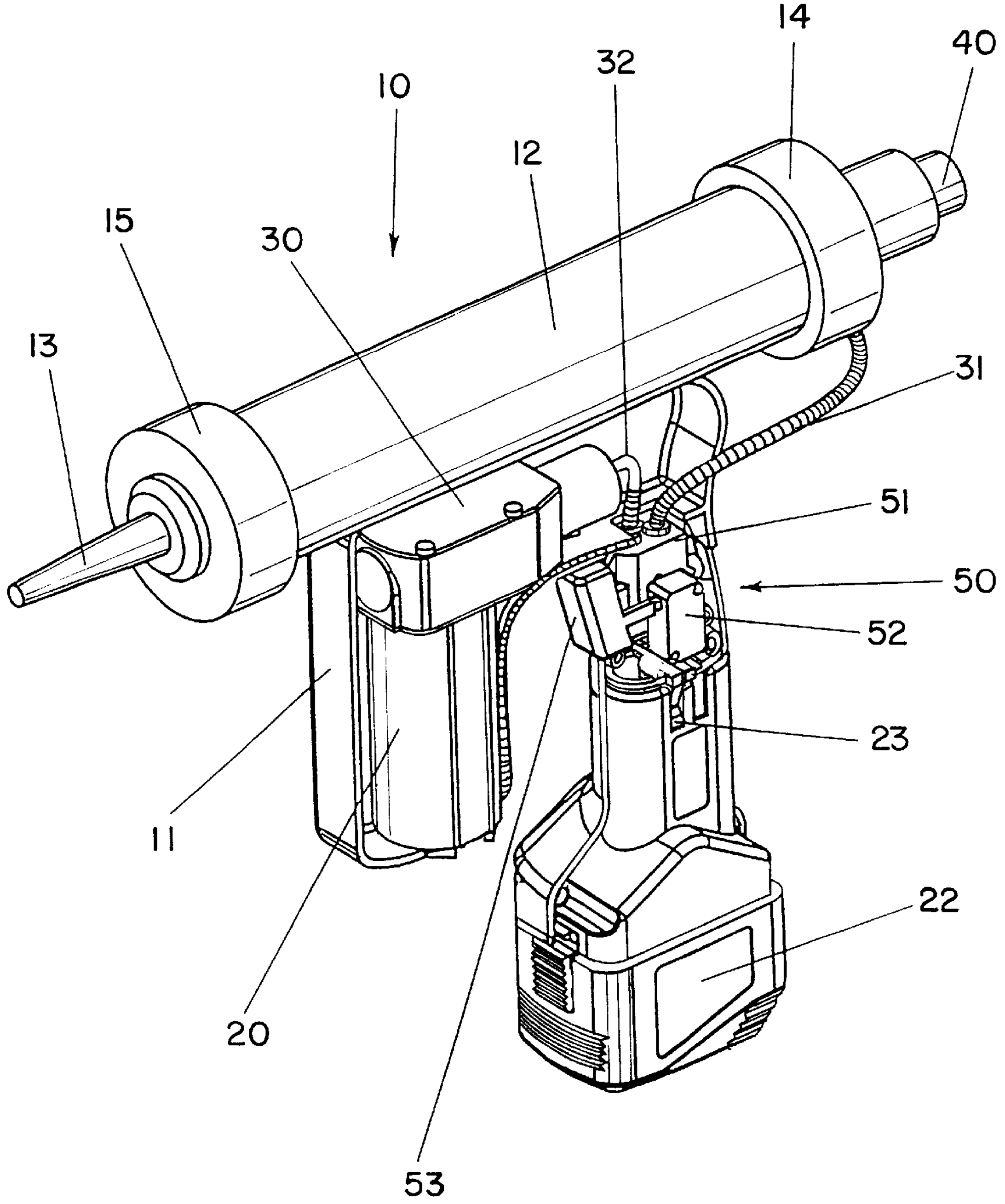
FIG. 2 shows the apparatus shown in FIG. 1 as assembled.

As is evident from FIGS. 1 and 2, both pressure switch 51 and switch 52 are arranged directly on the upper end, which is equipped at its end with contact surfaces 23, of battery 22 via a contact ring 54, resulting in a particularly compact configuration.

The apparatus described above for extrusion and metered delivery of free-flowing substances has the particularly great advantage that it can be used in battery-powered fashion entirely independently of external pressure lines and electrical cables, and can be operated with one hand; particularly advantageously, a uniform outflow of material is guaranteed by way of an adjustable pressure in the pressure space of tube 12, which can be precisely "activated" and "deactivated" by way of switching device 50.

What is claimed is:

1. An apparatus for the extrusion and metered delivery of free-flowing substances comprising a housing, a tube on said housing receiving a disposable material package, an expulsion nozzle on said tube, a single displaceable piston in said package movable in the direction of the expulsion nozzle to both move the substance in the package forwardly and to cause expulsion of the material from said nozzle, a compressed air connector on said tube opposite said expulsion nozzle, a compressor in said housing for supplying compressed air to said connector to cause forward movement of said piston, a motor connected to said compressor, and a quick-release fastener in opposed relationship with said housing surrounding said tube to releasably retain said tube on said housing.

2. The apparatus as defined in claim 1, wherein the electric motor is powered by a battery.

3. The apparatus as defined in claim 1, wherein there is provided on the housing a switching device with which the electric motor can be activated and deactivated and simultaneously therewith the compressed-air connector can be pressured and vented.

4. The apparatus as defined in claim 1, wherein a pressure regulator is provided with which the pressure acting on the piston can be adjusted.

5. An apparatus as defined in claim 1, wherein the electric motor in line-powered.

* * * * *